United States Patent
Dominguez-Montes

(10) Patent No.: US 8,363,976 B2
(45) Date of Patent: Jan. 29, 2013

(54) METHOD OF RENDERING CROSS IMAGES UNOBSERVABLE PARTICULARLY IN PROJECTED OR PRINTED PHOTOGRAPHIC REPRODUCTIONS, AND REPRODUCTION THUS OBTAINED

(75) Inventor: Juan Dominguez-Montes, Las Rozas (ES)

(73) Assignee: Juan Dominguez-Montes, Las Rozas (Madrid) (ES)

( * ) Notice: Subject to any disclaimer, the term of this patent is extended or adjusted under 35 U.S.C. 154(b) by 1223 days.

(21) Appl. No.: 11/813,120

(22) PCT Filed: Dec. 29, 2004

(86) PCT No.: PCT/ES2004/000587
§ 371 (c)(1),
(2), (4) Date: Jul. 24, 2008

(87) PCT Pub. No.: WO2006/072641
PCT Pub. Date: Jul. 13, 2006

(65) Prior Publication Data
US 2009/0046945 A1   Feb. 19, 2009

(51) Int. Cl.
*G06K 9/40* (2006.01)

(52) U.S. Cl. .......................................... 382/274; 382/154
(58) Field of Classification Search .................. 382/154, 382/274
See application file for complete search history.

(56) References Cited

U.S. PATENT DOCUMENTS

| 5,402,191 A | 3/1995 | Dean et al. |
| 6,442,301 B1 * | 8/2002 | Edgar ............................. 382/275 |
| 6,532,008 B1 | 3/2003 | Guralnick |

FOREIGN PATENT DOCUMENTS

JP   2002-084551 A   3/2002

* cited by examiner

*Primary Examiner* — Claire X Wang
*Assistant Examiner* — Michael Vanchy, Jr.
(74) *Attorney, Agent, or Firm* — Tristan A. Fuierer; Moore & Van Allen, PLLC

(57) ABSTRACT

The method renders unobservable cross images with low light intensity that appear in the combined reproduction of various different images. It consists of adding a percentage in negative of each of these cross images to the positive of the correct image prior to reproduction, so that as a result of this addition it is possible to obtain, instead of the cross image, a uniform, contrastless image, i.e. where all the points have the same light intensity, which is generally so small as to be unobservable.

10 Claims, 3 Drawing Sheets

1

2

3

4

5

6

7

8

9

10

11

METHOD OF RENDERING CROSS IMAGES UNOBSERVABLE PARTICULARLY IN PROJECTED OR PRINTED PHOTOGRAPHIC REPRODUCTIONS, AND REPRODUCTION THUS OBTAINED

CROSS-REFERENCE TO RELATED APPLICATIONS

This application is filed under the provisions of 35 U.S.C. §371 and claims the priority of International Patent Application No. PCT/ES2004/000587 filed on 29 Dec. 2004.

OBJECT OF THE INVENTION

The method that is the object of this invention renders unobservable cross images with low light intensity that appear in the combined reproduction of various different images and it consists of adding a percentage in negative of each of these cross images to the positive of the correct image prior to reproduction. As a result of this addition, instead of the cross image, a uniform, contrastless image is produced, i.e. all the points in the image have the same light intensity, which is generally so small as to be unobservable.

FIELD OF THE INVENTION

The invention belongs to the field of stereoscopic image reproductions, particularly projected or printed photographic images, and to the field of flip image or three-dimensional reproductions with two or more images on lenticular screens.

BACKGROUND OF THE INVENTION

The problem of cross images in stereoscopic reproductions is well known. These systems only use two images, which are captured from two horizontally separate points. There have been many methods of directing a different image to each eye. Most of these methods have the disadvantage that the images are not perfectly differentiated and although each eye receives the correct image, i.e. the image captured on the left is directed at the left eye and the image captured on the right is directed at the right eye, there is a low light intensity that cannot be fully differentiated, meaning that part of the left eye image reaches the right eye and vice versa. This part of the image is called cross image, or crosstalk, and the phenomenon of the ghosting effect.

The most commonly used differentiating elements in stereoscopic systems with only two images are linearly or circularly polarised filters, coloured filters and shutter glasses.

Cross images also appear on devices which manage two or more images and on devices where a different image appears depending on the angle from which they are viewed (flip images). In these cases the differentiating element tends to be a lenticular screen or a parallax barrier.

If the reproduction is displayed on a cathode ray tube, liquid crystal screen or projector, plasma screen or micromirror projectors, as the image is stored on an electronic medium it can be processed algorithmically. U.S. Pat. No. 6,532,008 (Guralnick) discloses an algorithm that is applicable to such cases.

If a photographic medium is used, to apply an algorithm it would be necessary to first transfer the images to an electronic medium, which has the following disadvantages, among others: loss of definition, increase in costs and time delay due to the changes of media and electronic processing of the image using algorithms. This method is therefore unsuitable for photographic reproduction systems in general and particularly those that use projected reproduction with a photographic medium.

U.S. Pat. No. 402,191 (Dean et al.) discloses a method that is suitable for the projection of an image on a photographic medium based on scattering the cross image by using special glasses.

There is obviously a need for a general method that eliminates cross images, whatever their medium and therefore suitable for systems where the images are on a photographic medium, without having to first transfer the images to an intermediate electronic medium and without having to complicate the systems currently in use, whether because it makes the reproduction system more expensive or because it uses specially designed viewing glasses for this purpose.

The object of this invention is to meet this need.

DESCRIPTION OF THE INVENTION

For the sake of simplicity in this description an image reproduced on a surface is considered as a number of points (x,y) on this surface, where each of these points is assigned values $r1(x,y)$, $r2(x,y)$ ... that are functions of the coordinates x,y that determine their light and colour features.

In the simplest case, an image i in positive and in black and white can be considered a function $Pi(x,y)$ whose value for each point indicates its light intensity in the visible spectrum. Its maximum value will be W.

Similarly, the image in negative of the previous positive image can be mathematically represented as a function $Ni(x,y)$ whose value for each point indicates its light intensity in the visible spectrum and therefore the following should be true: $Pi(x,y)+Ni(x,y)=W$.

It is easy to see that if any conventional image is represented by the previous mathematical functions, the following first important basic fact for this invention can be deduced.

"If we add to or illuminate an image i reproduced in positive $Pi(x,y)$ with another image which is the reproduction in negative of the same image i $Ni(x,y)$, the result is a contrastless image with a constant luminosity W (regardless of coordinates x, y), i.e. all the points of the image have the same luminosity W".

The second basic fact of this invention relates to the viewer and can be described by saying that:

"A contrastless image (like the one described above) is unobservable when its light intensity W is small in relation to the light intensity of another image that is reproduced together on the same surface".

The object of this invention is a method that makes use of these two properties to render unobservable cross images in reproductions in general and particularly projected or printed photographic reproductions.

In stereoscopic reproductions, two different images are used, each of which is directed at a different eye. When linearly polarised filters are used, one of the images is filtered in a polarisation direction that is perpendicular to that of the other image and the same filters are placed in front of the viewer's eyes.

The image corresponding to one eye is projected through a polarised filter with a transmittance of value "a" and it is viewed through a filter that is polarised in the same direction. The total transmittance, i.e. through the two filters polarised in the same direction, can be considered of the same value "a" as through a single filter.

To reach the other eye this same image must pass through a filter polarised in the polarisation direction perpendicular to the first. The transmittance through two filters with polarisation directions that are perpendicular to each other has a value "b" that, although lower than "a", is not zero. This is what causes cross images.

Consequently, each eye receives a correct image corresponding to that eye with a relative intensity of value "a" and a cross image corresponding to the other eye with a light intensity of value "b"; i.e. there is a relative percentage of cross image of 100b/a. In commercially marketed filters the normal values of a and b are approximately a≅40 and b≅5, whereby the relative percentage of cross image is approximately 12.5%.

The percentages values of cross image when using circular polarisation filters, blocking filters or coloured filters are similar to those mentioned previously.

There are other reasons why cross images are accentuated or generated, such as those deriving from the use of a single display screen for all the images. If reproduced on a cathode ray tube and the images are multiplexed in time, one image may appear as a cross image in the following image due to the inertia of the phosphorus. If projected using polarised filters on a metalized screen the reflected polarisation does not always maintain the direction and quality of the incident one, which accentuates the cross image.

Devices that reproduce several different images together and in which each of the images is viewed from a different angle (flip images) are also common. A lenticular screen consisting of a number of convergent cylindrical lenses adjacent to one another and situated on the same plane tends to be used as a differentiating element. The images are situated on the focal plane of these lenses, divided into thin strips parallel to the axis of these cylinders.

Total or partial internal reflections in the lenticular screen and printing defects mean that the other images are seen from the viewing angle reserved for an image, although with lower light intensity. The percentages of illumination of cross images are of the same magnitude as in the stereoscopic images seen above.

However, correcting cross images by using the method that is the object of this invention is independent from the reason that causes them, which could be any of those mentioned above or others.

The magnitude of the percentage of illumination of cross images in the above-described devices may be considered sufficiently low as to render unobservable the cross images by applying the method of the invention, whose operational steps or phases are specified below:

A first step in which the percentages bij of cross image j in the correct image i are identified in the reproduction, A second step consisting of adding the negatives of the cross images j to the correct image i in a percentage b'ij prior to reproduction, and A third step consisting of repeating the previous steps until the cross images are unobservable.

If bij is correctly identified, it will not be necessary to perform the third stage of the method. It is important to bear in mind that b'ij=bij only if two single images are reproduced. In the case of n images in which the percentages of leakage bij=b, to avoid having to perform the third stage b'ij=b/[1+(n−2)b] must be performed for all of them. In general, a simple calculation of b'ij is sufficient to avoid this third stage.

The percentage of uniform, contrastless image into which the cross image is converted by adding its negative to it is b'ij=b in the case of two images. However, there is additional leakage caused by the images in negative added prior to reproduction, meaning that said percentage increases to value b/(1−b). This same phenomenon also occurs when the number of images is higher than two.

DETAILED DESCRIPTION OF THE FIGURES

Figure 1:
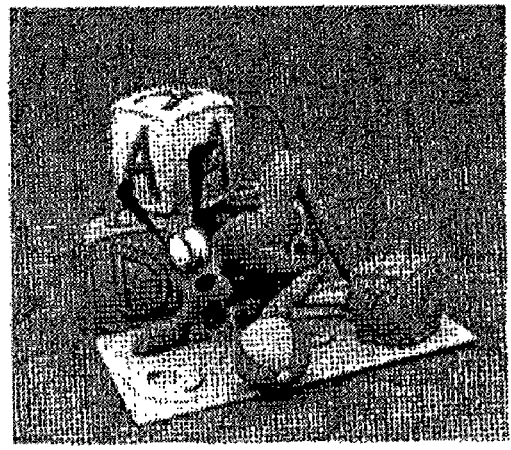
FIG. 1 shows that the result of adding to the positive of an image, 1, the negative thereof, 2, is a contrastless image 3.
Figure 1:
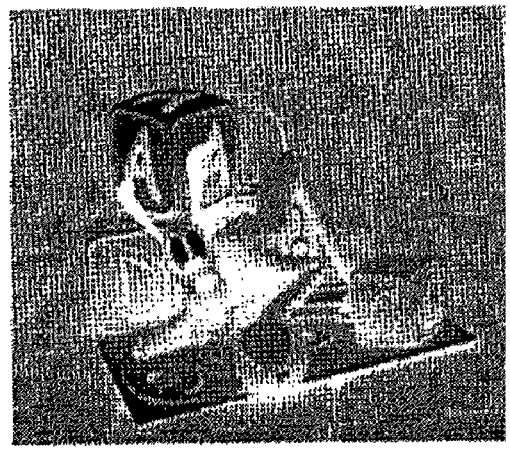
Figure 1:
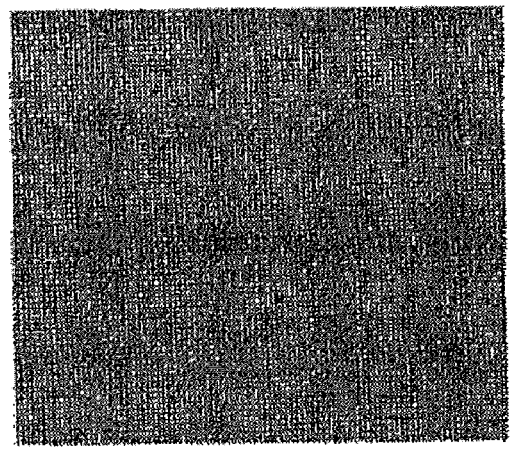

FIG. 1 shows in images the property on which the method of this invention is based. The positive of an image 1 that can be represented by function $P1(x,y)$ is added to the negative of the same image 1, 2, which can be represented by function $N1(x,y)$ resulting in a contrastless image 3. This figure clearly shows that if we add to or illuminate an image i reproduced in positive with another image that is the reproduction in negative of this same image i, the result is an image with uniform luminosity W at all points of the image, i.e. $Pi(x,y)+Ni(x,y)=W$. This property is independent of the medium used, which may be photographic or electronic.

Figure 2:
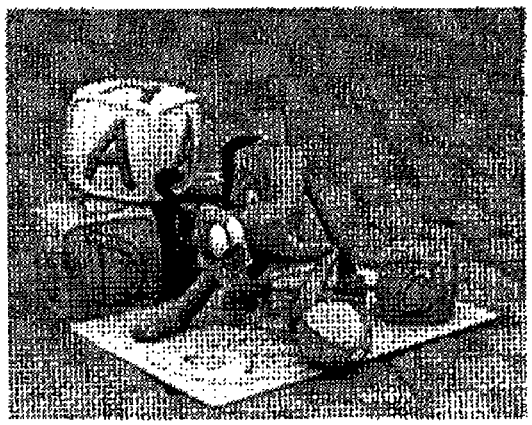
FIG. 2 shows the corresponding images 4 and 5 prior to reproduction and the reproduced images 7 and 8 contaminated with cross images.
Figure 2:
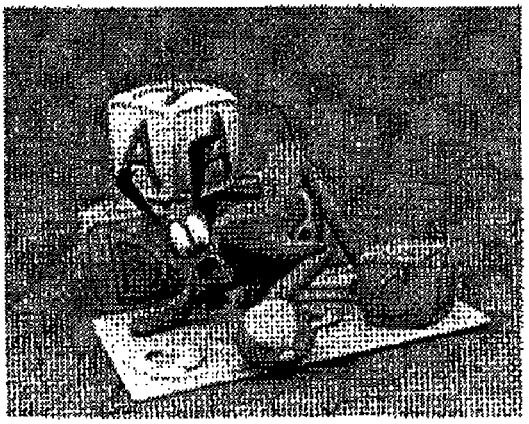
Figure 2:
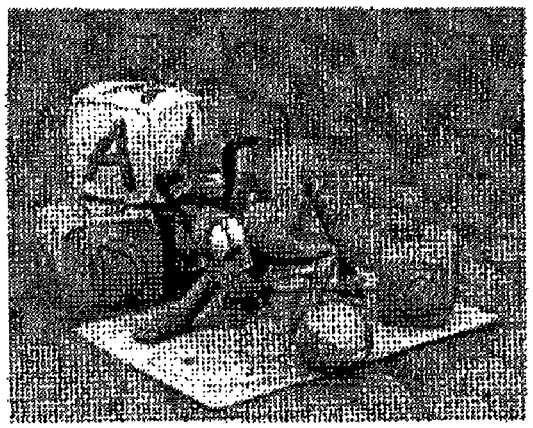
Figure 2:

FIG. 2 shows in images the appearance of cross images. The images prior to being reproduced are shown in 4 and 5 and the images as they are seen after their reproduction are shown in 6 and 7. These images 4 and 5 may correspond to stereoscopic images, as shown here, to flip images or to any other application. This figure clearly shows the presence in 6 of the cross image 5 with low light intensity b % compared to the correct image (100%), 4 and the presence in 7 of the cross image 4 with low light intensity b % compared to the correct image 5 (100%). A value of 20% cross image has been chosen for b. This value is higher than the one that usually appears in stereoscopic or flip image reproductions and this has been done to highlight the cross images for illustrative purposes.

Figure 3:
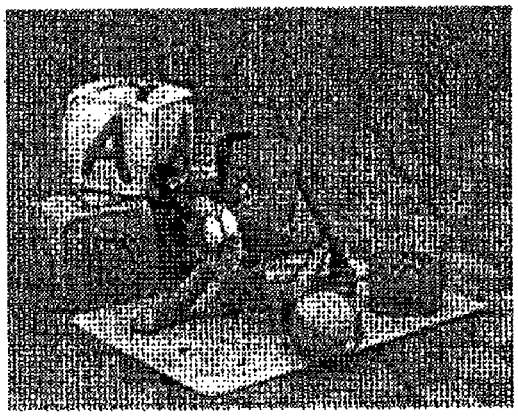
FIG. 3 shows images 9 and 10 prepared for deletion of the cross images and the reproduced images 11 and 12 with unobservable cross images.
Figure 3:
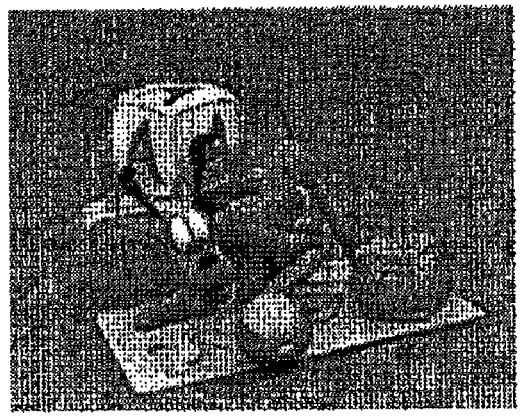
Figure 3:
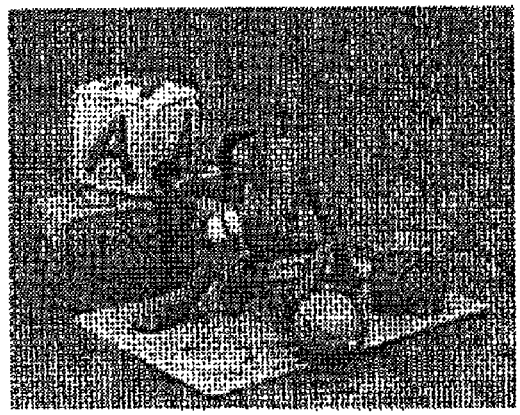
Figure 3:
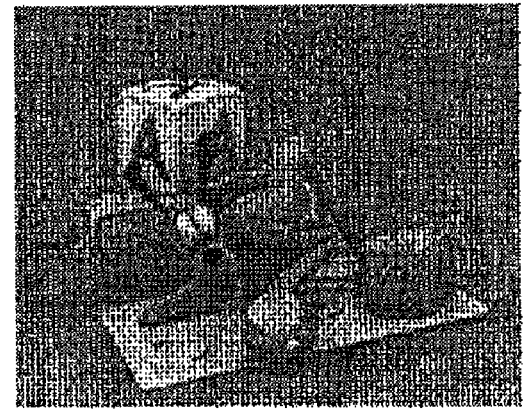

FIG. 3 shows in images the process of removing the cross images. Firstly, the percentage of cross image that appears on the reproduced images 6 and 7 shown in FIG. 2 must be identified, the value of this percentage being b. Secondly, the percentage b of the negative of the cross image is added to each of images 4 and 5 prior to the reproduction process. Therefore, the percentage b of the negative of image 5 is added to image 4, resulting in image 8. Similarly, the percentage b of the negative of image 4 is added to image 5, resulting in image 9. FIG. 3 also shows images 10 and 11, which result from the reproduction of images 8 and 9. It can be seen that the cross images in images 6 and 7 have become a contrastless, unobservable image. Conceptually, FIG. 3 also explains the method to follow in the case of n images, in which case if the percentage of cross image is the same and is value b for all the images, the percentage of image in negative that must be added to any of the other images j must be the value bij=b[1+(n−2)b].

The invention claimed is:

1. A method of rendering unobservable cross images, particularly in projected or printed photographic reproductions, comprising the steps of:
   (a) identifying in said reproduction a percentage bij of a cross image j in a correct image i, wherein b represents light intensity;
   (b) adding the negatives of the cross images j to the correct image i in a percentage b'ij, prior to reproduction; and
   (c) repeating the previous steps until the cross images are unobservable.

2. The method according to claim 1, wherein the percentage b'ij of cross image added is the same percentage bij of identified image.

3. The method of claim 2, wherein the medium of images is photographic.

4. The method of claim 2, wherein the medium of images is electronic.

5. The method according to claim 1, wherein the number n of reproduced images is greater than two and the percentage of cross image identified bij is the same b for all the images and in which case the percentage is b'ij=b/[1+(n−2)b].

6. The method of claim 5, wherein the medium of images is photographic.

7. The method of claim 5, wherein the medium of images is electronic.

8. The method according to claim 1, wherein the medium of the images is photographic.

9. The method according to claim 1, wherein the medium of the images is electronic.

10. A photographic reproduction obtained using the method of claim 1.

* * * * *